United States Patent Office 2,896,276
Patented July 28, 1959

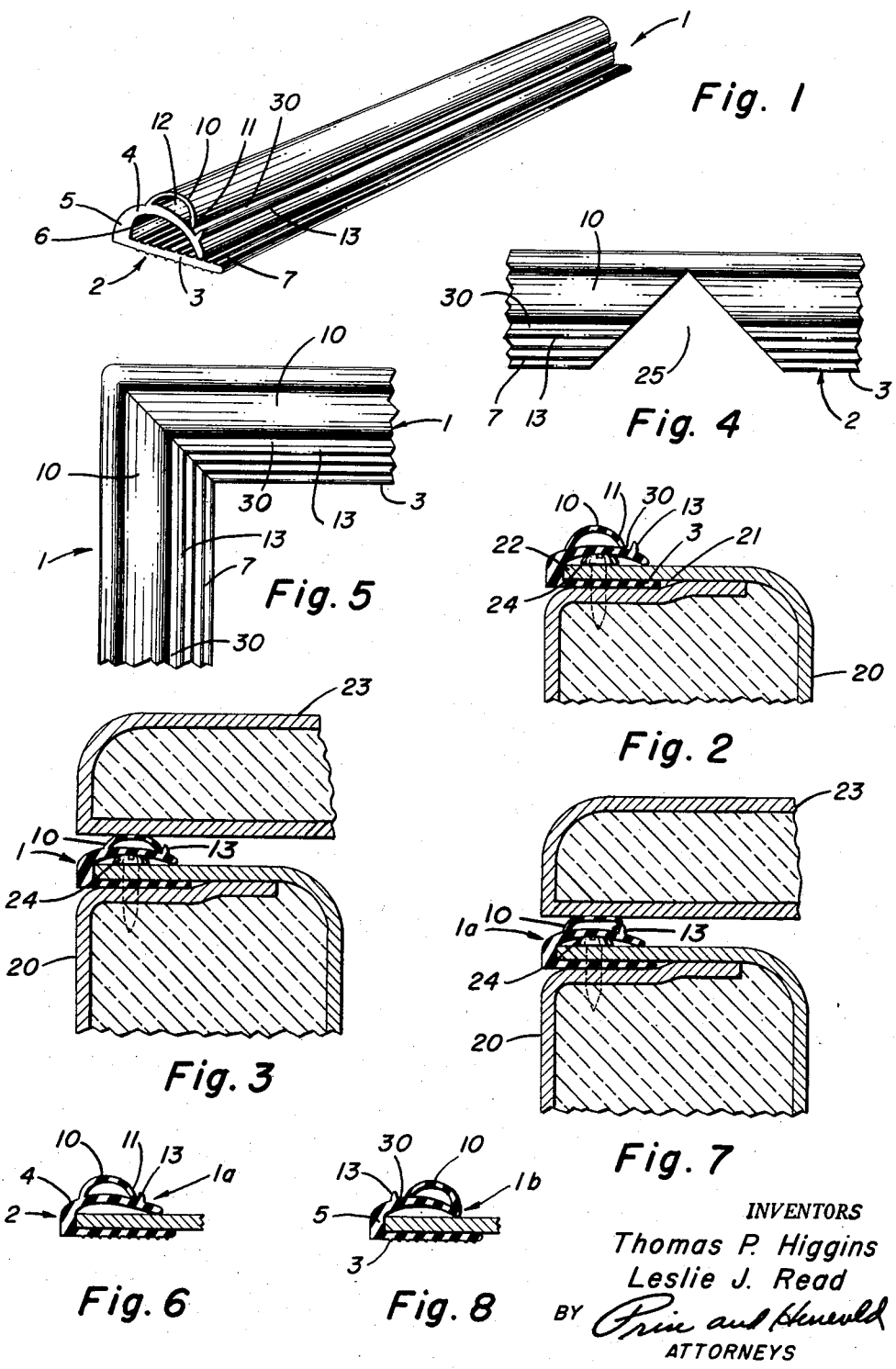

2,896,276

LOW COMPRESSION RESISTANT SEALING GASKET

Leslie J. Read and Thomas P. Higgins, Grand Rapids, Mich., assignors to Corduroy Rubber Company, Grand Rapids, Mich., a corporation of Delaware Application July 9, 1956, Serial No. 596,500

4 Claims. (Cl. 20—69)

This invention relates to gaskets and more particularly to gaskets for equipment such as refrigerators, deep freezers and ice boxes as well as other articles.

To facilitate the opening of doors on this type of equipment, it has become necessary to reduce the resistance of the seal against the door. This opening resistance or pressure must be sustained by the door latch. Thus, the greater it is, the stronger the latch and the greater the force necessary to cause the latch to release. The object of this invention is to provide a gasket which will effect a tight seal yet exert a greatly reduced opening pressure against the door, making it possible to materially reduce the total force necessary to release the latch. One important benefit of this improvement is to make it possible for small children, trapped within equipment of this type, to push against the door and open it by forcing the latch to release. Heretofore, this has not been possible.

Gaskets having high compressibility and producing low resistance pressures have been known but they have not been entirely satisfactory. Among the difficulties experienced with gaskets of this type has been their inability to effect a secure seal, particularly where the closing surfaces are not perfectly parallel. Difficulty has also been experienced as a result of their inability in many instances to return to or recover their original shape upon release. Another difficulty has been the inability to combine in a single gasket element a low pressure seal and an element which is neither porous nor likely to collect dirt or frozen condensate in and around the sealing member.

This invention overcomes each of these difficulties and at the same time provides a gasket having sufficient body to readily support itself upon the equipment's base structure. This gasket is also adapted to be fitted around corners with a minimum of difficulty and without detrimental effect upon its ability to effect a seal.

These and other objects and purposes of this invention will be readily seen by those acquainted with the manufacture and application of gaskets upon reading the following specification and drawings.

In the drawings:

Fig. 1 is an oblique view of our improved gasket.

Fig. 2 is a fragmentary sectional view showing the gasket mounted upon a supporting structure.

Fig. 3 is a fragmentary sectional view showing the gasket in compressed or seal effecting condition.

Fig. 4 is a fragmentary plan view of the gasket cut to form a 90 degree corner.

Fig. 5 is a fragmentary plan view of a corner structure employing the gasket shown in Fig. 1.

Fig. 6 is a fragmentary cross sectional view of a modified form of the gasket.

Fig. 7 is a fragmentary sectional view of the modified gasket illustrated in Fig. 6, shown in compressed condition.

Fig. 8 is a fragmentary cross sectional view of a further modified form of the gasket.

Figure 9:
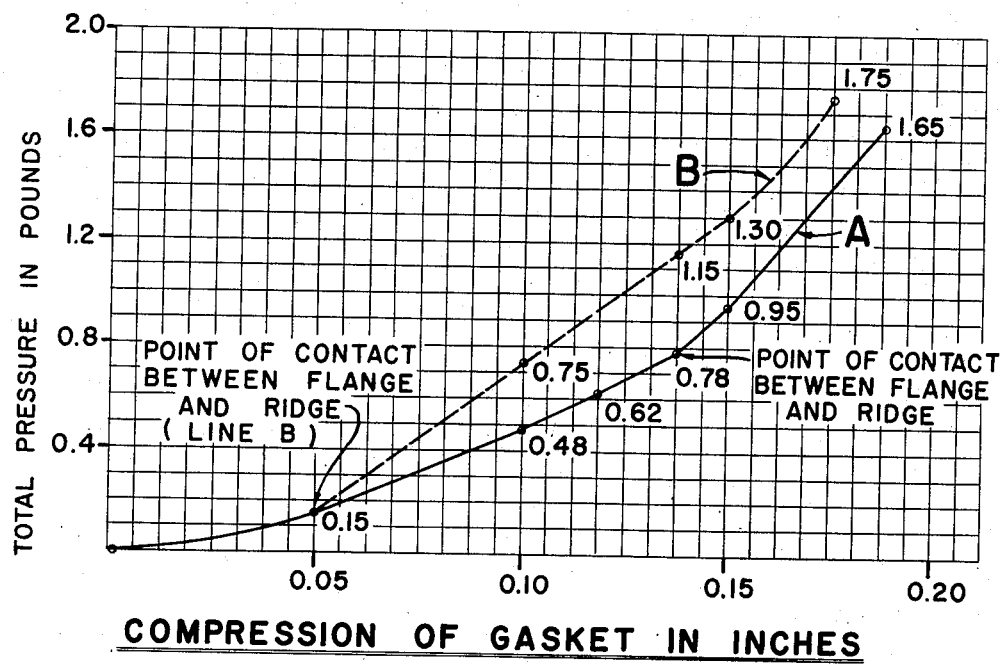
Fig. 9 is a graph illustrating the effect of regulating the movement of the sealing flange of the gasket.

In executing the objects and purposes of this invention there has been provided a gasket having a base suitable for mounting it to one wall of the opening to be sealed. In the particular embodiment shown, this base is generally U-shaped to define a pocket into which a projecting portion of the supporting wall is seated. On the leg of the base, overlying the supporting structure and facing into the opening, the gasket has an arcuate sealing flange. This flange has a thin wall structure and as a result is readily collapsible.

The flange forms a pocket or chamber between it and the base. This chamber is open along one edge of the flange since the flange itself is integral with the base along one edge and is free along the other edge. Immediately adjacent the free edge of the flange is an upstanding ridge designed to contact or be closely adjacent to the free edge of the flange and to restrain its movement across the base when the flange is compressed. However, the free edge of the flange and the ridge are so designed that they do not effect an air seal. Thus, the air within the chamber may be expelled easily and quickly as the flange collapses.

Referring specifically to Figs. 1 and 2, the numeral 1 indicates a gasket having a generally U-shaped base 2. The base 2 consists of an inner leg 3 and an outer leg 4 connected by a web 5. The base 2 defines a narrow pocket 6 which preferably is partically restricted by the free ends of the legs 3 and 4 when the gasket is not mounted to its supporting structure. Both faces of the inner leg 7 may be provided with small parallel ribs 7 to increase the frictional grip between the gasket and the supporting structure.

The base preferably is of a flexible material such as rubber or plastic but has sufficient wall thickness that its compressibility is limited. It is designed to have sufficient inherent strength that when mounted on a door or about the opening of a refrigerator it will remain in place with a minimum of support from conventional fasteners or adhesives.

On the outer side of the leg 4 is an arcuate sealing flap or flange 10. The flange 10 along one edge is integral with the leg 4 adjacent the web 5. The other edge 11 of the flange is free. The flange 10 has a thin wall and thus is readily collapsible when a surface, such as that of a door, presses against it. The flange 10 is arched outwardly from the base, creating an interior chamber of sufficient height that a complete seal will be effected by the gasket by the time the door has latched but without entirely collapsing the flange 10. Without intending to be limited to these proportions, the general shape of the chamber 12 defined by the flange 10 is indicated by the fact that the height of the chamber is approximately 0.175 of an inch when the width of the chamber along the base is approximately 0.40 of an inch. The flange in this particular example had a wall thickness of approximately 0.032 of an inch. These figures are illustrative only and it will be recognized that numerous variations may be made in the values and in the proportions they bear to each other.

Projecting outwardly from the leg 4 is a ridge 13. The ridge is of sufficient height to act as a stop against lateral movement of the free edge of the flange 10 across the base as the flange is compressed. In the form shown in Figs. 1, 2 and 3, the ridge 13 is so located on the base 4 that a space 30 of approximately $\frac{1}{16}$ of an inch exists between it and the free edge 11 of the flange when the gasket is free of external pressure. It is important that there is no physical attachment between the free edge of the flange 10 and the ridge 13. This creates a gap through which air may be expelled from the chamber 12 when the sealing flange is collapsed. As will be brought out more fully later, the spacing between the edge 11 of the flange and the ridge 13 may be increased or decreased depending upon the amount of resistance desired and the total travel of the door after contact with the crown of the flange has been established.

Fig. 2 illustrates the mounting of the gasket. The supporting structure 20, which may be either the stationary wall or the door of a piece of equipment such as a refrigerator, has a portion of its exterior shell extending outwardly away from the rest of the shell, creating a pocket 21 (Fig. 2). The gasket, in the form shown, is mounted by seating the base 1 about the projecting portion 22 and the rest of the wall structure. The gasket is then firmly secured by installation of the screws 24.

This gasket may be made from any suitable material. A preferred material is natural rubber. It may, however, be fabricated from synthetic rubber or mixtures of synthetic and natural rubber or from synthetic resin materials. When natural rubber is used, a rubber having a durometer value in the range of 47–70 is employed. Preferably the durometer value range is 55–60. When synthetic resin materials are used, a material having similar characteristics is chosen. A basic requirement is that the material must have sufficient elastic memory that it will quickly recover its original position upon release of the compressive pressure resulting from closure of the door. It must be capable of crawling or creeping after closure of the door so that it will quickly shape itself to an unevenness in the surface it contacts. It is also necessary that it be able to repeat this recovery without fatiguing throughout a large number of operating cycles. It is also essential that the material retain its original flexibility and elastic memory even though compressed for a long period of time or chilled to the normal operating temperatures of refrigeration equipment. It must have sufficient tensile strength that it will not readily tear or rip should it become slightly bonded to the compressing structure for any reason such as the accumulation of frost.

*Operation*

As the door is closed, it contacts the crown of the flange 10. Continued closing movement of the door causes the flange 10 to flatten inwardly. As the flange flattens, air is expelled from beneath it.

During the major portion of the closing movement of the door after it has contacted the flange 10, the compression or flattening of the gasket occurs by reason of the sliding of the free edge 11 laterally across the base 1. During this portion of its compression, the flange offers only the resistance inherent in its structural stiffness. This is relatively little, because of its flexibility and the thinness of its wall section. It acts as a beam having one end free and the other end secured by a pivot. This assures sufficient compression of the flange to create a wide area of contact between it and the surface pressing against it. However, the flange's resistance normally is not sufficient to cause it to push up into any pockets or irregularities in the surface pushing against it.

To effect this is the function of the ridge 13. The last fraction of closing movement of the door causes the free end 11 of the flange to contact the ridge 13. The flange thereafter acts as an arched beam rigidly pinned on both ends. This substantially increases its resistance to compression. This resistance gives the flange sufficient strength to warp or conform itself to the contours of the surface pressing against it. Since the flange's resistance is increased only during the last fraction of the closing movement, it does not materially increase the total closing pressure necessary for effective operation. It is intended that the total travel after contact with the flange 10 will be limited to one to three thirty-seconds of an inch with the build up in flange resistance limited to the last one sixty-fourth to one thirty-second of an inch of this travel.

Because the edge 11 of the flange is not attached to the base, the air within the chamber 12 is not trapped and may escape readily between the base and the edge of the flange. This eliminates any resistance due to build up of air pressure within the chamber 12. The air within the chamber 12 is not relied upon to support the flange 12 and may move freely into and out of the chamber.

As the door is opened, the flange will immediately reassume its normal position, recreating the chamber 12. Since air may enter freely under the flange's free edge 11, the re-entry of the air does not retard the flange from assuming its normal position.

Sometimes the closing movement of the door produces a slight lateral movement of the contacting surface across the gasket due to its rotation about a remote pivot point. Gaskets of normal construction resist this lateral travel, thus, increasing the total resistance to closure of the door. As is obvious from the illustration in Fig. 7, this gasket does not resist this lateral movement. The crown of the flange is capable of limited lateral travel with the moving surface. This eliminates the necessity for any sliding movement of the surface of the gasket along the surface of the member it contacts. Rubber has a high coefficient of friction. Thus, this sliding movement can add materially to the force necessary to close the door, particularly when a gasket encircling the entire door is considered as a whole. This invention, thus, reduces the force necessary to effect a seal.

The importance of the use of the rib 13 or an equivalent means of limiting free lateral movement of the edge of the flange is illustrated by the graph presented in Fig. 9. This graph is based upon tests made with a six inch length of the gasket illustrated in Fig. 1.

In the first test, the length of gasket was mounted on a rigid support in the manner it would be if installed on a refrigerator. The gasket was then compressed and both the travel of the compressing member and the total pressure exerted on the gasket was recorded. In the test which developed the values expressed as curve A, the gap 30 was .0625 of an inch. The test shows a marked increase in the resistance of the flange 10 to collapse after contact between the edge 11 and the stop 13. This occurred after nine sixty-fourths of an inch travel of the compressing member after initial contact was made. The stiffening of the flange by supporting the free edge 11 is illustrated by the fact that during a distance of approximately 0.018 of an inch immediately preceding contact with the stop produced an increase in required pressure of only 0.16 of a pound while a travel of approximately 0.0125 of an inch after contact with the stop produced an increase in required pressure of 0.17 of a pound. It is also illustrated by the fact that a compression of the gasket up to contact with the ridge 13 required a travel of 0.1375 of an inch and produced a resistance of 0.78 of a pound which a travel of 0.05 of an inch after contact increased the resistance 0.87 of a pound.

The curve B was developed from values obtained on a specimen identical to that used to develop the values for curve A except that the gap 30 was only 0.017 of an inch. Curve B illustrates the fact that the results are comparable except the sharp increase in resistance occurs earlier. Thus, the width of the gap 30 is dictated by the distance the door moves after initial contact with the gasket. The shorter this distance, the closer the stop 13 must be to the free edge 11. The acceleration of the rate of increase of resistance appearing at the right hand end of line B results from the flange's tendency to fold as illustrated in Fig. 7.

This gasket permits the door to effect a major portion of its movement after contact with the gasket both quickly and with relatively little resistance. This prevents bounce back or rejection of the door by the gasket. It also assures positive engagement of the latch.

Part of the importance of this invention lies in the ability to determine accurately the point at which the resistance curve will turn sharply upward. In conventional refrigerator equipment it is desirable to limit the compression of the gasket to the range of 0.04 to 0.09 of an inch. The rapid increase in the gasket's resistance should be limited to the last 20% to 50% of the closing travel after initial contact has been made.

Figs. 4 and 5 illustrate the method of making a sharp corner with this gasket. Where a ninety degree corner is to be made, a wedge-shaped portion of the gasket is removed. The resulting opening 25 severs the entire gasket laterally except the web 5. The web 5 is left intact. A suitable adhesive is then applied to the edges of the wedge-shaped cut-out 25 and the gasket bent until the walls make tight contact, as illustrated in Fig. 5. It will be recognized that where corners other than ninety degrees are to be formed, the shape and size of the wedge portion 25 removed will be varied correspondingly. Where corners are formed about a curve of substantial radius, this gasket may be bent to conform without collapse of the flange 10.

While this invention has been described as though it were mounted on the stationary frame of the structure, it will be recognized that it may, with equal facility, be mounted upon the door and brought into contact with a stationary surface by closure of the door. This invention is to be considered as though the gasket may be applied in either position. It is also to be recognized that this invention's utility is not limited to refrigerators or similar equipment since it has utility wherever a seal is desired with a minimum of sealing pressure.

*Modifications*

In Fig. 6 the structure of the gasket 1a is identical to that of the gasket 1 except that no gap is provided between the ridge 13 and the flange 10. The free end 11 of the flange seats against the ridge 13 when the flange 10 is free of compressive pressure. This arrangement increases the rigidity of the flange since it has the resistance of an arch pinned on both ends throughout the entire compression of the flange. It may also tend to slightly restrict the escape of air from the chamber 12. This, under some circumstances, may increase the time required to compress the flange when a given closing force is exerted.

When the door is closed on the gasket structure 1a, the arch formed by the flange 10 is somewhat flattened as is shown in Fig. 7. Where the height of the gasket is reduced beyond that permitted by flattening, the free edge of the gasket may have a tendency to roll over partially, as shown in Fig. 7. Again, the total travel of the door is limited normally to between 1/32 and 3/32 of an inch after initial contact with the gasket. Again, the principle is employed of rapidly increasing the resistance of the gasket to compression during the last portion of closing travel.

In the modified structure shown in Fig. 8, the gasket 1b is identical to the gasket 1 except that the relationship of the sealing member of flange 10 has been reversed with respect to the base 2. Thus, the free end of the flange 10 is adjacent the web 5 of the base and the edge of the flange integral with the base is remote from the web. It will be recognized that this gasket may be formed in this manner both with and without the gap 30 shown in Fig. 5. It will also be recognized that the operation of the gasket remains identical to that shown in Fig. 1.

This invention provides a gasket having a base of sufficient strength and resistance to be readily installed upon its supporting structure. At the same time, it provides a tubular sealing flange from which the air is readily expressed but which retains sufficient resistance to effect a seal conforming to an uneven surface. At the same time, the total closing pressure which must be applied to effect the seal is substantially reduced over that of conventional gaskets. The gasket presents a sealed, smooth and ornamental external appearance, making it desirable for application to such home appliances as refrigerators and deep freezers.

While we have shown a preferred embodiment and several modifications of our invention, it will be recognized that other modifications may be made which do not depart from the principles of this invention. Each of these modifications is to be considered as included in the hereinafter appended claims unless these claims by their language expressly state otherwise.

We claim:

1. A gasket comprising; a flat leg adapted to underlie a supporting structure, a first arcuate leg overlying said flat leg and, said arcuate leg being arched outwardly from said flat leg and secured to said flat leg along one of its edges, its other edge being free and slidably contacting the supporting structure above said flat leg, a second arcuate leg overlying said first arcuate leg and secured along one of its edges to said first arcuate leg, said second arcuate leg being arched outwardly from said leg and having its other edge constantly contacting said first arcuate leg and slidable thereon.

2. A gasket comprising; a flat leg portion adapted to underlie a gasket supporting structure, a first arcuate leg secured to said flat leg along one edge thereof and arched over said flat leg with the terminal edge thereof being disposed in slidable contacting engagement with said supporting structure as received over said flat leg, a second arcuate leg secured to said first arcuate leg along one edge thereof and arched over said first arcuate leg with its own terminal edge in slidable contacting engagement with the surface of said second arcuate leg, said second arcuate leg being more pliable than said first arcuate leg to assure the compression thereof on said first arcuate leg precedent to its compression on said supporting structure.

3. A gasket comprising; a flat leg adapted to underlie a supporting structure, a first arcuate leg overlying said flat leg and, said arcuate leg being arched outwardly from said flat leg and secured to said flat leg along one of its edges, its other edge being free and slidably contacting the supporting structure above said flat leg, a second arcuate leg overlying said first arcuate leg and secured along one of its edges to said first arcuate leg, said second arcuate leg being arched outwardly from said leg and having its other edge constantly contacting said first arcuate leg and slidable thereon, and an upstanding ridge provided near the terminal edge of said first arcuate leg for engagement by said second arcuate leg to limit the compression thereof on said first arcuate leg precedent to said first arcuate leg being compressed on said structural member.

4. A gasket comprising; a flat leg portion adapted to underlie a gasket supporting structure, a first arcuate leg secured to said flat leg along one edge thereof and arched over said flat leg with the terminal edge thereof being disposed in slidable contacting engagement with said supporting structure as received over said flat leg, a second arcuate leg secured to said first arcuate leg along one edge thereof and arched over said first arcuate leg with its own terminal edge in slidable contacting engagement with the surface of said second arcuate leg, said second arcuate leg being more pliable than said first arcuate leg to assure the compression thereof on said first arcuate leg precedent to its compression on said supporting structure, and an upstanding ridge provided near the terminal edge of said first arcuate leg for engagement by said second arcuate leg to limit the compression thereof on said first arcuate leg precedent to said first arcuate leg being compressed on said structural member.

References Cited in the file of this patent

UNITED STATES PATENTS

| Number | Name | Date |
|---|---|---|
| 2,294,101 | Tripp | Aug. 25, 1942 |
| 2,640,230 | Eck et al. | June 2, 1953 |
| 2,647,792 | Flemming | Aug. 4, 1953 |
| 2,700,197 | Kesling | Jan. 25, 1955 |
| 2,701,395 | Barroero | Feb. 8, 1955 |
| 2,811,406 | Moore et al. | Oct. 29, 1957 |
| 2,839,793 | Fields | June 24, 1958 |